(12) United States Patent
Volta et al.

(10) Patent No.: US 12,277,714 B2
(45) Date of Patent: Apr. 15, 2025

(54) DETECTION CLUSTERING

(71) Applicant: Zoox, Inc., Foster City, CA (US)

(72) Inventors: Stanley Lilian Volta, Mountain View, CA (US); Allan Zelener, San Mateo, CA (US)

(73) Assignee: Zoox, Inc., Foster City, CA (US)

( * ) Notice: Subject to any disclaimer, the term of this patent is extended or adjusted under 35 U.S.C. 154(b) by 0 days.

(21) Appl. No.: 18/653,393

(22) Filed: May 2, 2024

(65) Prior Publication Data

US 2024/0289964 A1 Aug. 29, 2024

Related U.S. Application Data

(63) Continuation of application No. 17/509,121, filed on Oct. 25, 2021, now Pat. No. 12,002,217.

(51) Int. Cl.
| | |
|---|---|
| *G06V 10/25* | (2022.01) |
| *G06T 7/13* | (2017.01) |
| *G06T 7/181* | (2017.01) |
| *G06T 7/70* | (2017.01) |
| *G06V 10/26* | (2022.01) |
| *G06V 10/44* | (2022.01) |
| *G06V 20/56* | (2022.01) |

(52) U.S. Cl.
CPC ........... *G06T 7/181* (2017.01); *G06T 7/13* (2017.01); *G06T 7/70* (2017.01); *G06V 10/25* (2022.01); *G06V 10/26* (2022.01); *G06V 10/457* (2022.01); *G06V 20/56* (2022.01); *G06T 2207/30252* (2013.01); *G06T 2210/12* (2013.01); *G06V 2201/07* (2022.01)

(58) Field of Classification Search
None
See application file for complete search history.

(56) References Cited

U.S. PATENT DOCUMENTS

| | | | |
|---|---|---|---|
| 2020/0218913 A1* | 7/2020 | Unnikrishnan | G01S 13/867 |
| 2021/0042955 A1* | 2/2021 | Lee | G06T 7/70 |
| 2022/0114815 A1* | 4/2022 | Ko | B60T 7/22 |
| 2022/0234622 A1* | 7/2022 | Stetson | G06V 20/56 |
| 2022/0245955 A1* | 8/2022 | Freeman | G06T 7/13 |

OTHER PUBLICATIONS

Office Action for U.S. Appl. No. 17/509,121, mailed on Aug. 31, 2023, Stanley Lilian Volta, "Detection Clustering", 24 pages.

* cited by examiner

*Primary Examiner* — Idowu O Osifade
(74) *Attorney, Agent, or Firm* — Lee & Hayes, P.C.

(57) ABSTRACT

Techniques for determining detection boxes representing objects in an environment using pixel clustering are disclosed herein. Autonomous vehicle sensors can capture data in an environment that may include separate objects, such as large and/or articulated vehicles. In an example, the data can include a plurality of pixels that are associated with a large object. A vehicle computing system can generate a detection box for each pixel of the plurality of pixels and can determine at least one averaged detection box representing the large object. In an example, the vehicle computing system can control the vehicle based in part on the at least one averaged detection boxes.

20 Claims, 7 Drawing Sheets

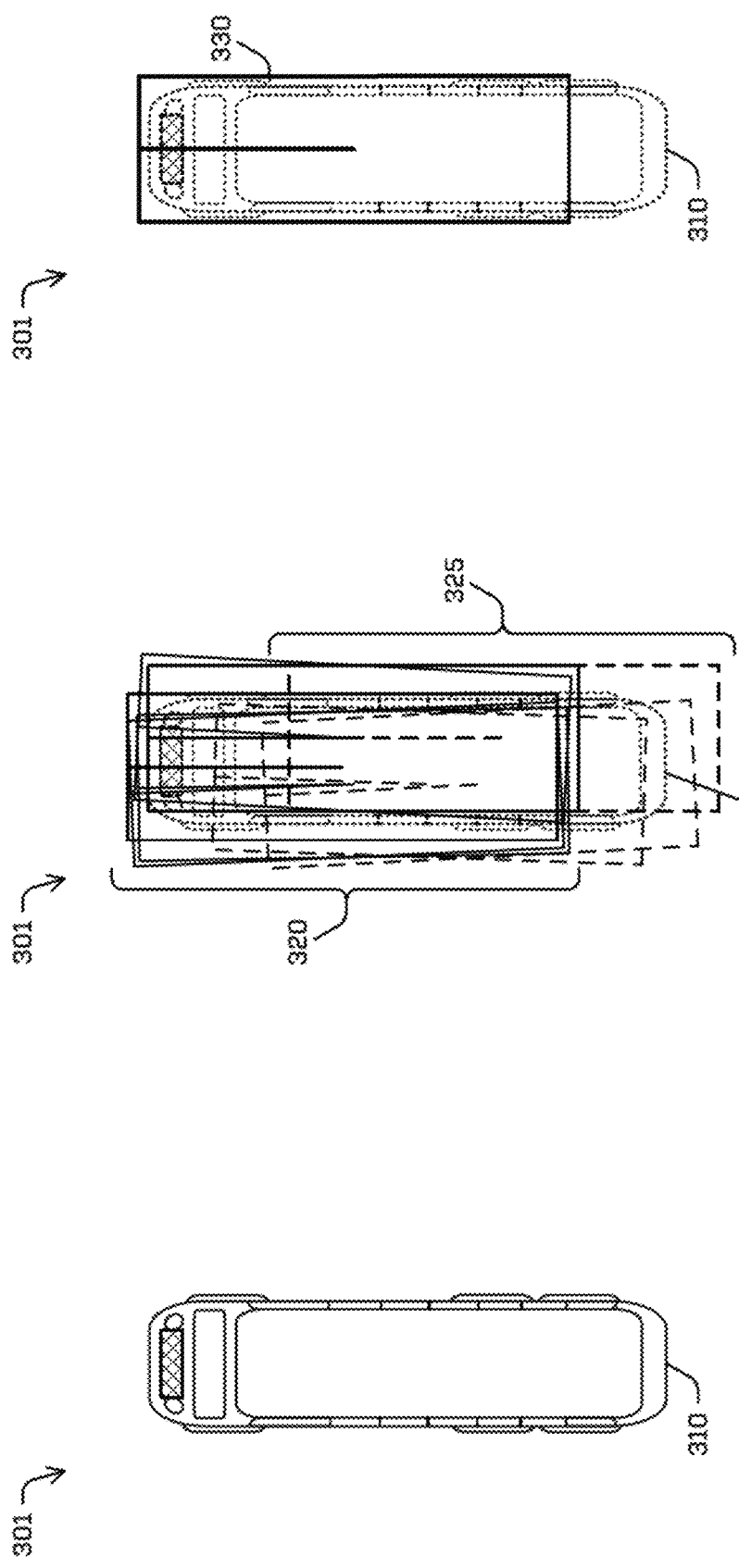

DETECTION CLUSTERING

CROSS-REFERENCE TO RELATED APPLICATION

The present application is a continuation of, and claims priority to pending U.S. application Ser. No. 17/509,121, filed on Oct. 25, 2021, the entire disclosure of which is hereby expressly incorporated herein by reference.

BACKGROUND

Various systems are utilized by autonomous vehicles to guide such autonomous vehicles through environments including around various static and dynamic objects. For instance, a vehicle computing system may generate one or more trajectories to guide autonomous vehicles through congested areas with other moving vehicles (autonomous or otherwise), moving people, stationary buildings, etc. A variety of sensors may be used to collect information about objects in the surrounding environment, which may be used by the vehicle computing system to determine physical parameters of such objects within the environment, such as dimensions, geometry, boundaries, position, yaw, etc. The vehicle computing system may use these physical parameters in order to safely travel in the environment. Accurately determining the physical parameters of objects in the environment may, at times, present challenges.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 3A is a diagrammatic representation of a large vehicle, in accordance with examples of the disclosure.

FIG. 3B is a diagrammatic representation of multiple detection boxes, in accordance with examples of the disclosure.

FIG. 3C is a diagrammatic representation of a final detection box, in accordance with examples of the disclosure.

DETAILED DESCRIPTION

Techniques for determining detection boxes representing objects in an environment using pixel clustering are discussed herein. While the disclosed techniques may be used to determine detection boxes for objects of any size and/or shape, in various examples, the disclosed techniques may be used to determine detection boxes for large objects. A large object can include an articulated vehicle (e.g., tractor trailer, bus, etc.) and/or a vehicle that is greater than a threshold length (e.g., 15 feet, 20 feet, 10 meters, etc.). In conventional object detection systems, a vehicle computing system may create a single large bounding box to represent a large vehicle (e.g., bus, semi-tractor-trailer, etc.). However, the single large bounding box may not accurately depict the boundaries of the large object through the environment. For example, an articulated object may initiate a turn, causing a first portion of the articulated object to move independent of a second portion. The representation of a single bounding box may not accurately depict the independent movement and may result in the vehicle computing system making control determinations based on inaccurate object data. For another example, if an orientation of the large object is slightly inaccurate, the single bounding box can result in large discrepancies and inaccuracies in object data. Alternatively, the vehicle computing system may create two separate bounding boxes for a single articulated vehicle (e.g., semi-tractor-trailer), such as a first bounding box representing a cab of a tractor and a second bounding box representing a trailer. However, due to the nature of movement of the vehicle, the first bounding box and the second bounding box may often overlap, leading to inaccuracies in object data from which the vehicle computing system determines vehicle control movements.

In some examples, sensors of an autonomous vehicle can capture sensor data of an environment, which may include objects separate from the autonomous vehicle, such as other vehicles or pedestrians. An image representing the environment from a top-down perspective can be generated based at least in part on the sensor data. Image data for the image may include pixel data associated with specific pixels in the image. The pixel data can be used to determine detection boxes representing objects in the environment. The autonomous vehicle may then use such detection boxes to safely navigate through the environment.

Figure 1:
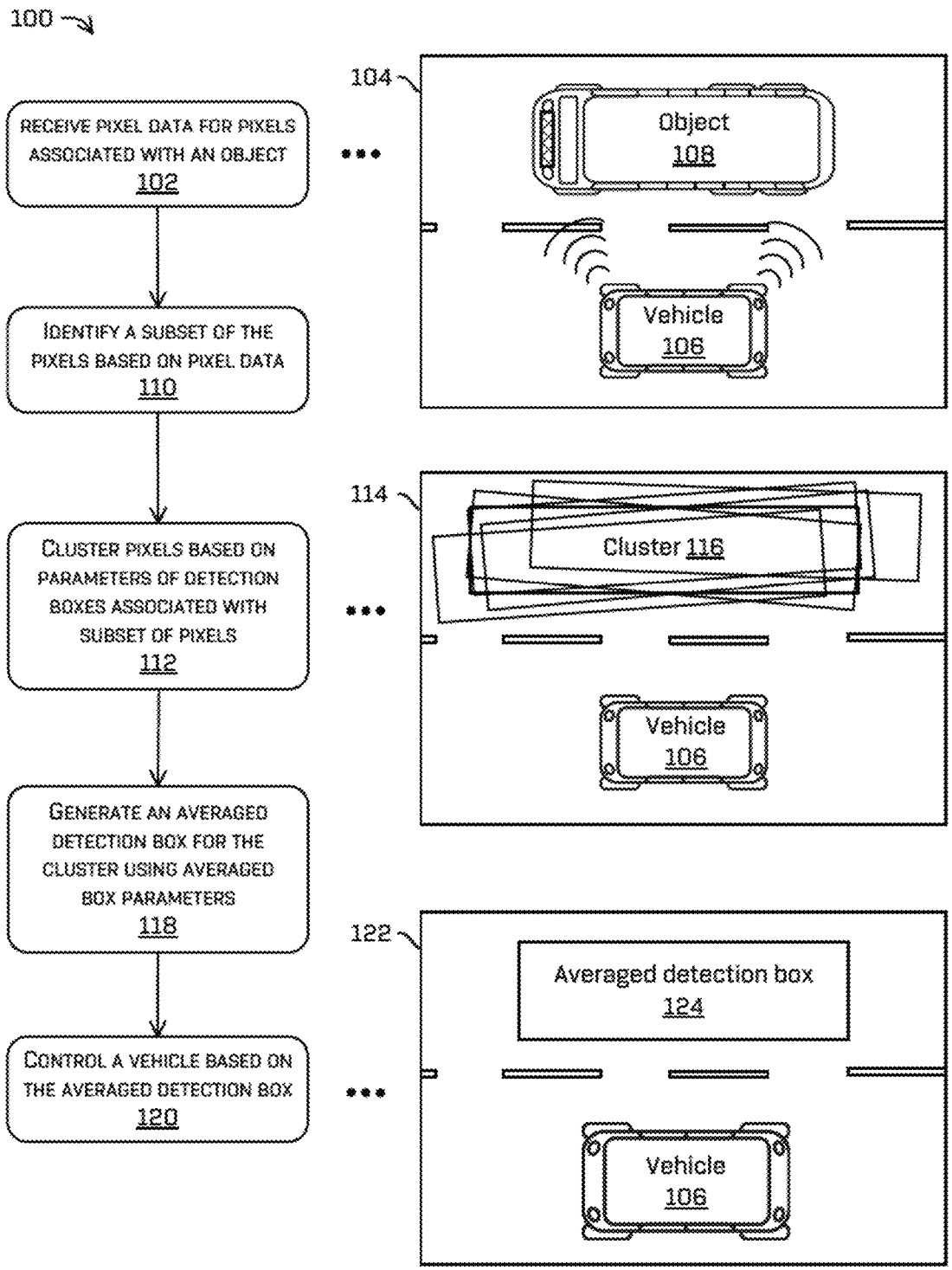
FIG. 1 a pictorial flow diagram of an example process for generating detection boxes using clustering, in accordance with examples of the disclosure.
Figure 6:
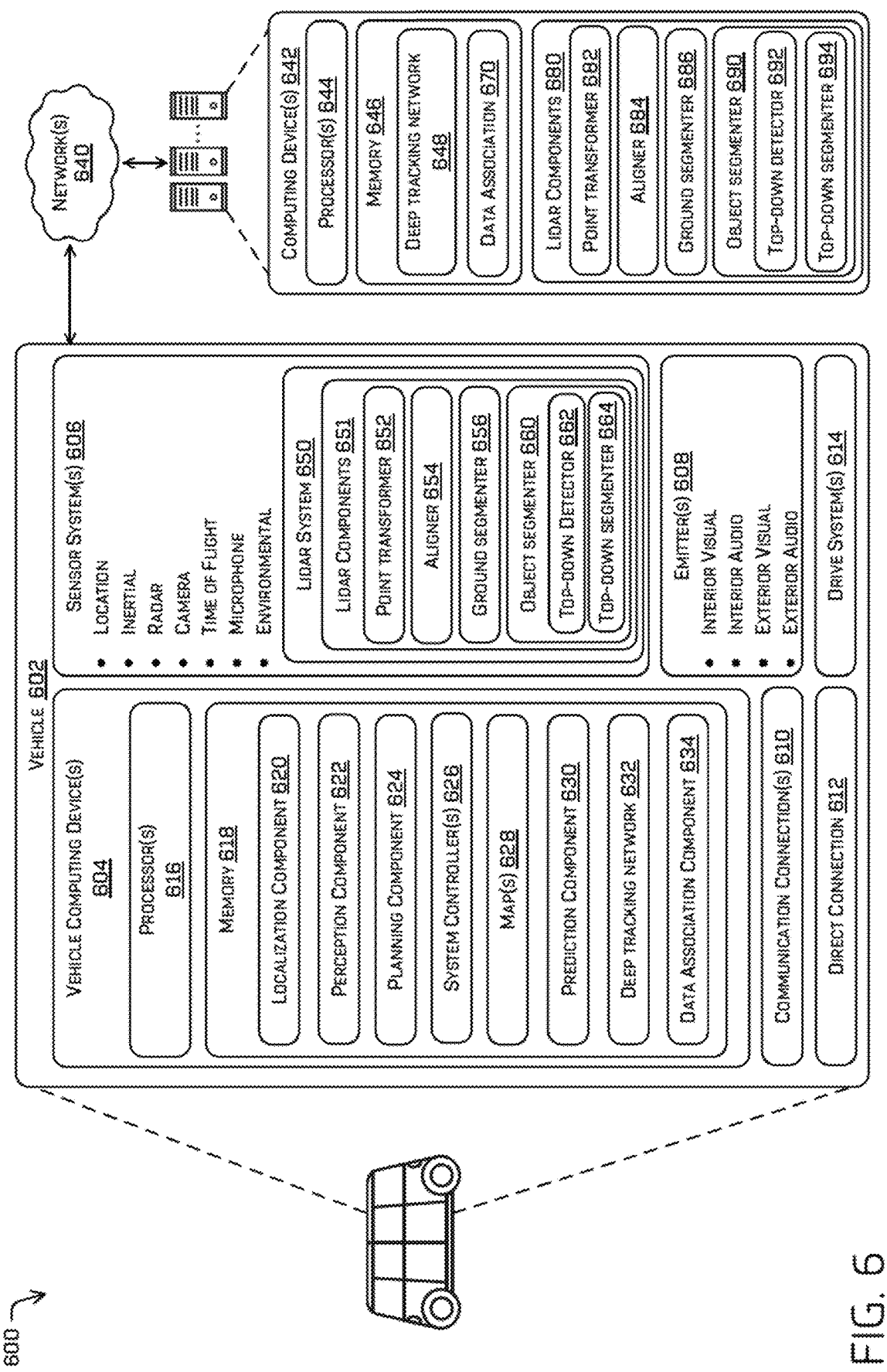
FIG. 6 depicts a block diagram of an example system for implementing the methods described herein.
Figure 7:
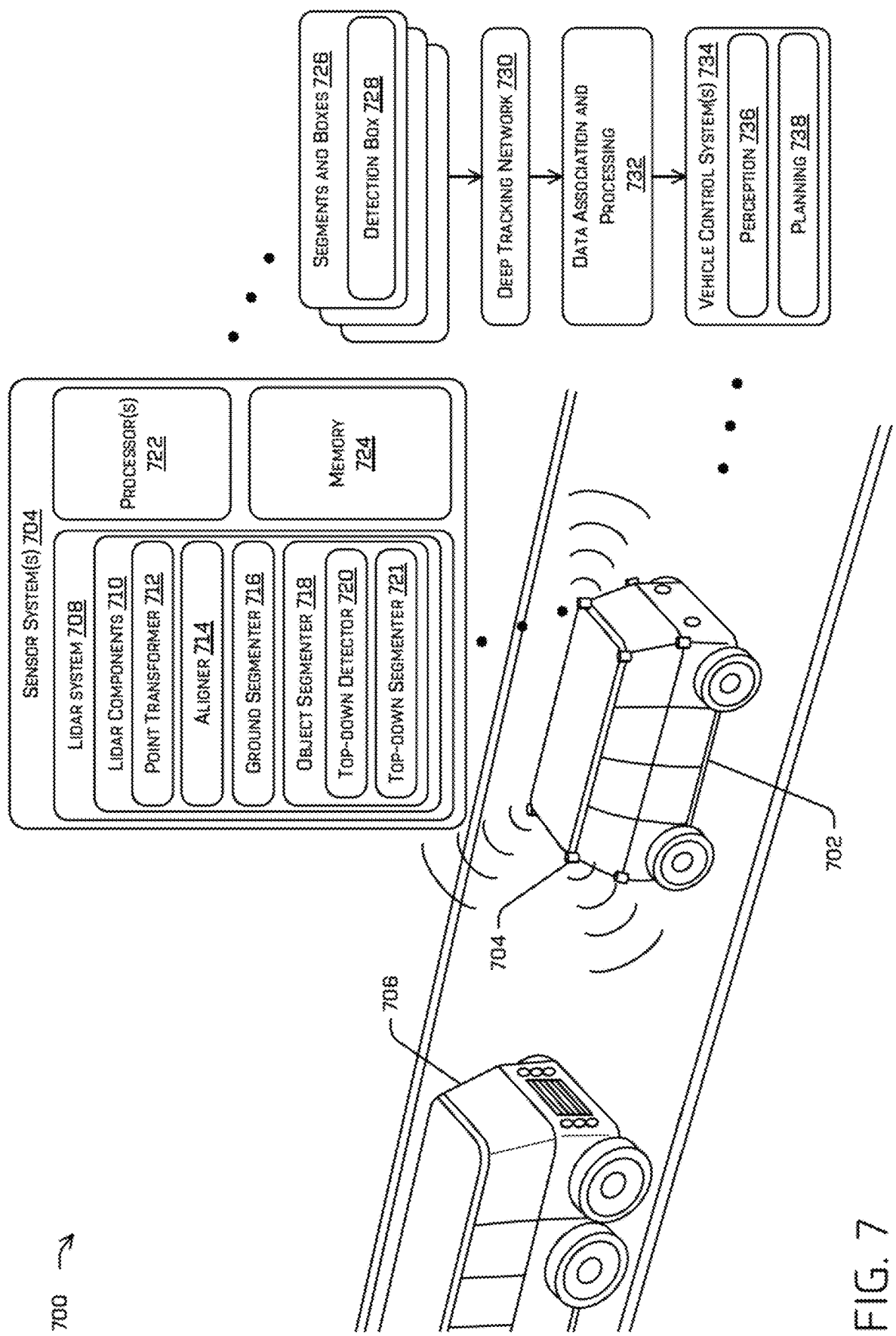
FIG. 7 illustrates an example environment and components of a vehicle configured for generating detection boxes using clustering for use in controlling the vehicle, in accordance with examples of the disclosure.

FIG. 1 is a pictorial flow diagram of an example process 100 for pixel clustering and detection box generation. In examples, one or more operations of the process 100 may be implemented by a vehicle computing system, such as by using one or more of the components and systems illustrated in FIGS. 6 and 7 and described below. For example, one or more components and systems can include a top-down detector 662, a top-down segmenter 664, a top-down detector 692, and/or a top-down segmenter 694 illustrated in FIG. 6 and/or a top-down detector 720 and/or a top-down segmenter 721 illustrated in FIG. 7. However, the process 100 is not limited to being performed by such components and systems, and the components and systems of FIGS. 6 and 7 are not limited to performing the process 100.

In examples, the pixel data may be associated with pixels associated with an object in an environment. For example, the pixel data associated with the example 104 may include pixel data for pixels associated with the object 108. For each such pixel, the pixel data may include data that can be used to determine detection box parameters for a detection box associated with that pixel. For example, pixel data may be used to determine detection box parameters such as dimensions of a detection box (e.g., a length, width, and/or height of the detection box), coordinates of a center of the detection box, a detection box center offset distance (a distance from the center of the detection box to the associated pixel), a detection box center offset direction (a direction from the pixel to the center of the detection box associated with the pixel), and position data for the detection box (e.g., yaw). Pixel data may additionally or alternatively include data such as coordinates or location information for the pixel (e.g., pixel location in a grid), an indication of a detection class assigned to the pixel (e.g., representing a class of object associated with the pixel), and/or a confidence value. In various examples, a confidence value associated with a pixel may indicate an object classification confidence (e.g., reflecting a confidence that the object class assigned to the pixel is accurate), an instance confidence (e.g., reflecting a confidence that a pixel is accurately detected as part of an existing object (e.g., that the pixel is correctly identified as part of an existing object)), a feasibility confidence (e.g., reflecting a confidence that the pixel is accurately associated with an existing object (e.g., that the object with which the pixel is associated exists)), a quality score (e.g., reflecting quality of sensor data used to detect the object associated with the pixel), and/or any combination thereof. Note that in various implementations, any one or more pieces of such pixel data may be included in image data or generated based on image data or other pixel data.

In various examples, a confidence value may be associated with a detection confidence representing a confidence of whether the pixel will generate a detection. Such a confidence value may represent how well a ground-truth box matches to an anchor box associated with the pixel, where the pixel may be associated with multiple anchor boxes (e.g., detections) centered on the pixel but with varying aspect ratios.

The pixel data received by the vehicle computing system at operation 102 may be data included in image data or generated based on image data. Image data may include data generated based on sensor data generated and/or collected by one or more sensors configured on a vehicle traveling in an environment. In various examples, the sensors include one or more vision sensors, such as lidar sensors, camera sensors, radar sensors, sonar sensors, ultrasonic transducers, any other suitable sensors, and any combination thereof. Pixel data may be generated based on image data generated using such sensor data. In various examples, image data and/or sensor data may be processed using a neural network and/or other systems and processes to generate such pixel data. Instead of, or in addition to, pixel data, data representing 2-dimensional points, 3-dimensional points, cells, grid data, and/or other data associated with objects in an environment may be generated and used to generate clusters and detection boxes as described herein. Such data may be discretized data based on data originating at one or more sensors and processed according to the examples described herein.

The image data may represent a top-down view of the environment in which a vehicle is traveling. In some examples, the vehicle computing system may be configured to generate the image data and/or the top-down representation utilizing the techniques such as those described in U.S. patent application Ser. No. 16/151,607, filed Oct. 4, 2018 and entitled "Trajectory Prediction on Top-Down Scenes," and in U.S. patent application Ser. No. 16/504,147, filed Jul. 5, 2019 and entitled "Prediction on Top-Down Scenes based on Action Data," the entire contents of which are incorporated herein by reference for all purposes.

An example 104 illustrates an image of an environment that includes a vehicle 106 that may be configured with sensors to detect objects in the environment, such as an object 108. In examples, the vehicle 106 is configured with one or more lidar systems that may each include one or more lidar components, camera systems, and/or other detection systems configured to detect objects with the environment and/or classify objects detected in the environment.

At operation 110, the vehicle computing system identifies a subset of the pixels received at operation 102 that may be potentially associated with a particular object in the environment. In examples, the vehicle computing system may select pixels based on various types of data associated with pixel data, such as having a classification confidence value above a threshold confidence value (e.g., between 0 and 1) for a particular class assigned to the pixel (e.g., as represented in, or determined from, the associated pixel data). In various examples, where an individual pixel may have multiple associated anchor boxes, the vehicle computing system may select the pixel and a particular associated anchor box that has the highest detection confidence value from among the confidence values for the anchor boxes associated with that pixel, basing the detection box parameters for that pixel on the selected anchor box. In various examples, the classification associated and/or classification confidence value associated with a pixel can be determined utilizing machine learning techniques, such as by a machine learned model configured to classify pixels and/or objects in an image and determine associated classification confidence values.

For example, the vehicle computing system may select those pixels classified in the class "bus" with a greater than 0.5 confidence. In examples, the vehicle computing system may additionally or alternatively use one or more other criteria to select pixels for clustering. For example, the vehicle computing system may select those pixels in the "bus" class with sufficient confidence and having detection box center coordinates sufficiently proximate to one another (e.g., less than a threshold distance apart, within a specific range of locations, having locations in a grid that share an edge, etc.). In other examples, the vehicle computing system may additionally or alternatively use the detection box center offset distances and/or directions to select pixels. For example, the vehicle computing system may select pixels having detection box center offset distances less than a threshold distance and/or pixels having detection box center offset directions that are similar (e.g., substantially similar based on being less than a threshold difference from one another). In the example 104, the vehicle computing system may select those pixels that have a sufficient likelihood of being associated with object 108 based on any combination of pixel data included in or determined from the received pixel data.

At operation 112, the vehicle computing system generates a cluster of pixels by clustering pixels based on the parameters of detection boxes associated with the pixels in the subset identified at operation 110. Any one or more detection box parameters may be used to determine pixel clusters. In examples, the vehicle computing system determines a cluster by associating, in a particular cluster, those pixels that have proximate detection box centers (e.g., less than a threshold distance apart), similar detection box center offset directions, detection box center offset distances less than a threshold distance, have similar detection box position properties (e.g., have a similar yaw value, have yaw values within a specific range of values, etc.), detection box overlap (e.g., based on one or more Intersection over union (IoU) values as described herein), and/or are associated with a same or similar classification (e.g., object classification). In examples, any of the various potential combinations of detection box parameters and pixel data may be used by vehicle computing system to perform pixel clustering.

In examples, at operation 112 the vehicle computing system may additionally or alternatively determine an amount of overlap for detection boxes associated with the pixels and cluster those pixels associated with detection boxes that substantially or sufficiently overlap. For example, using detection box parameters associated with pairs or sets of pixels, the vehicle computing system may determine an Intersection over Union (IoU) value for the associated pairs or sets of detection boxes and then determine whether the IoU value is a sufficient value (e.g., greater than a threshold value). Where the IoU value is sufficient (e.g., indicating sufficient overlap of the detection boxes), the vehicle computing system may cluster the pixels associated with the detection boxes used to determine the IoU value.

An example 114 illustrates the detection boxes associated with the pixel cluster 116. The cluster 116 includes pixels determined to be associated with the object 108 and clustered based on their associated detection box parameters. The pixel data used to determine the cluster 116 may be data based on sensor data collected by sensors configured at vehicle 106, as noted above.

At operation 118, the vehicle computing system determines detection box parameters for a detection box for the cluster 116. To determine the detection box parameters for the cluster 116, the vehicle computing system may average the detection box parameters for the detection boxes associated with the pixels in the cluster 116. In examples, the vehicle computing system may determine average values for any one or more of the associated detection box parameters for the pixels in the cluster 116 to generate an averaged detection box. At operation 120, the vehicle computing system controls a vehicle using the averaged detection box. In various examples, the vehicle computing system may use additional or alternative techniques for determining the detection box parameters for the detection box for the cluster 116. For example, the vehicle computing system may perform a robust re-estimation of the detection box parameters for the detection boxes associated with the pixels in the cluster 116 to generate the detection box parameters for a detection box for the cluster 116.

The vehicle computing system may additionally or alternatively use pixel confidence values to determine a weighting factor to apply to the detection box parameters for detection boxes associated with the pixels in the cluster 116, when determining the detection box parameters for the cluster detection box. For example, the vehicle computing system may determine a higher weighting factor for the parameters associated with a pixel having a higher confidence value and a lower weighting factor for the parameters associated with a pixel having a lower confidence value. Then, when calculating the detection box parameters for the cluster detection box, the system may rely more heavily on those detection box parameters associated with pixels having higher confidence values, and thereby may generate a more accurate cluster detection box.

An example 122 illustrates the averaged detection box 124 associated with the cluster 116. The averaged detection box 124 represents the object 108 of the example 104 in the environment in which the vehicle 106 is operating. The averaged detection box 124 may be used by a vehicle control system to safely operate the vehicle 106 in the environment with the object 108.

In examples, pixel data may include, or may be used to determine, a confidence value for a respective pixel in the image. A pixel confidence value may be a confidence value associated with an object classification assigned to the pixel and/or associated with one or more other confidence values as described herein. The pixel confidence values may be used to filter out pixels with lower confidence values (e.g., confidence values below a particular threshold value) in an effort to remove pixels that are less likely to represent a particular object in the environment. Using data associated with the remaining pixels, detection boxes may be generated for each such remaining pixel. One or more of the resulting detection boxes in a group of sufficiently overlapping detection boxes may be filtered out using techniques such as non-maximum suppression (NMS). The remaining final one or more detection boxes may represent an object in the environment and may be used to operate the autonomous vehicle. However, because some of the pixels with lower confidence values (that therefore may have been filtered out) may represent portions of an object in the environment, the final detection boxes may not fully and accurately represent such an object. This may occur more often with large and/or articulated vehicles. The use of incomplete and/or inaccurate detection boxes may result in unsafe and/or less efficient navigation of the autonomous vehicle in the environment. Techniques described herein may, in some instances, result in a better understanding of the environment of the vehicle and the object therein, thereby leading to safer and/or more confident controlling of the vehicle.

As discussed herein, pixels may be clustered based on one or more of various types of pixel data that may be associated with a particular pixel. The detection box parameters for each pixel in a particular cluster may be averaged to generate a detection box for the cluster. Overlapping detection boxes may be filtered out using NMS or a similar technique. The remaining detection box(es) may then be used to represent an object in an environment by an autonomous vehicle navigating through the environment.

In examples, image data may be generated based on one or more sensors detecting an environment in which an autonomous vehicle may be travelling. This image data may represent an image of the environment (e.g., surrounding the vehicle) as viewed from above (e.g., a "top-down" image) created by transforming sensor data from one or more sensors. The one or more sensors can include multiple modalities (e.g., vision, lidar, radar, etc.). The image data may include pixel data for each pixel that may be associated with an object in an environment. For each such pixel, the respective pixel data may include (and/or be used to determine) one or more pieces of detection box data (e.g., detection box parameters) for a detection box associated with that pixel. For example, detection box data may include, but is not limited to, a length and width of the detection box, coordinates (e.g., "x, y") of a center of the detection box, a detection box center offset distance (a distance from the center of the detection box to the associated pixel), a detection box center offset direction (a direction from the pixel to the center of the detection box associated with the pixel), and detection box orientation data (e.g., yaw). Pixel data may additionally or alternatively include other data, such as an indication of a detection class and a confidence value (e.g., representing a class of object associated with the pixel and a confidence of that classification). In various examples, the confidence value, detection box parameters, and/or other types of pixel data can be determined utilizing machine learning techniques, such as by a machine learned model configured to segment and/or classify objects. Pixel data gathered in the past may be stored and used by a machine learned model to improve the quality of pixel data generated thereafter, thereby improving the generation of detection boxes using the technique described herein.

A subset of the pixels associated with image data may be selected based or more pieces of pixel data. For example, pixels associated with a same class of object and/or having a confidence value above a threshold value may be selected. Alternatively, or in addition, pixels having a distance of offset of the pixel relative to a center of a respective detection box less than a threshold value may be selected.

The detection box parameters for each detection box associated with each selected pixel may then be determined or generated. In examples, pixel data for each pixel may include and/or may be used to determine and/or generate parameters for an associated detection box that may include a length and width of the detection box, coordinates of a center of the detection box, a detection box center offset distance, a detection box center offset direction, and detection box position data. Pixel location data may also be determined and/or generated for use in determining locational relationships to other pixels (e.g., whether two pixels are neighbors (e.g., are proximate one another), whether the pixels share an edge in a grid, etc.).

One or more clusters of pixels may then be determined based on associated pixel data and/or pixel detection box parameters. For example, in an implementation, pixels that are neighbors, of the same class, and share a similar detection box center offset distance and direction may be clustered. Clusters that have too few pixels (e.g., fewer than a threshold number of pixels) and/or clusters that have low confidence (e.g., average confidence of the pixels in the cluster is lower than a threshold confidence value, maximum confidence of the pixels in the cluster is lower than a threshold confidence value, etc.) may be filtered out and not used to determine final detection boxes for use in controlling a vehicle.

For each remaining cluster, the values of the box parameters for each detection box associated with each pixel in the cluster may be averaged to generate average detection box parameters for a potential final averaged detection box. In examples, overlapping potential final averaged detection boxes may be filtered using NMS and/or otherwise filtered to remove overlapping detection boxes and/or outliers. Outlier potential final averaged detection boxes may be those potential final averaged detection boxes having one or more outlying detection box parameters. For example, potential final averaged detection boxes having box centers greater than a threshold distance from the centers of other potential final averaged detection boxes (e.g., averaged center of the potential final averaged detection boxes, next closest center, etc.) may be filtered out. For another example, potential final averaged detection boxes having yaw values greater than a threshold yaw value (e.g., averaged yaw value of the potential final averaged detection boxes, next closest yaw value, etc.) may be filtered out. The remaining final averaged detection boxes may then be provided one or more other autonomous vehicle systems for use in control of the vehicle. For example, final averaged detection boxes may be provided to a deep tracking network (DTN) for further processing (e.g., data association, states updates) and/or for use in control of a vehicle (e.g., by perception and/or planning systems).

The systems and techniques described herein may be directed to leveraging sensor and perception data to enable a vehicle, such as an autonomous vehicle, to navigate through an environment while circumventing objects in the environment. The systems and techniques described herein can utilize information sensed about the objects in the environment, e.g., pixel data and image data, to more accurately determine the physical parameters of the objects. By using pixel data and/or detection box parameters as described herein to determine pixel clusters and averaged detection boxes for such clusters representing objects in an environments, the examples described herein may result in increased certainty of object detections, thereby allowing an autonomous vehicle to generate more accurate and/or safer trajectories for the autonomous vehicle to traverse an environment. For example, techniques described herein may be faster and/or more robust than conventional techniques, as they may increase the reliability of the determination of dimensions and other physical parameters of objects in the environment, reducing the likelihood of failing to identify or misidentifying an object. That is, techniques described herein provide a technological improvement over existing object detection, classification, prediction and/or navigation technology. In addition to improving the accuracy with which image and pixel data can be used to determine objects and correctly characterize such objects, the systems and techniques described herein can provide a smoother ride and improve safety outcomes by, for example, more accurately providing safe passage to an intended destination.

The systems and techniques described herein can be implemented in a number of ways. Example implementations are provided below with reference to the following figures. Although discussed in the context of an autonomous vehicle, the techniques described herein can be applied to a variety of systems (e.g., a sensor system or a robotic platform), and are not limited to autonomous vehicles. For example, the techniques described herein can be applied to semi-autonomous and/or manually operated vehicle. In another example, the techniques can be utilized in an aviation or nautical context, or in any system involving objects or entities having dimensions and/or other physical parameters that may not be known to the system. Further, although discussed in the context of originating with lidar data and processing with lidar components, image and pixel data can include any two-dimensional, three-dimensional, or multi-dimensional data such as other types of image data (e.g., stereo cameras, time-of-flight data, and the like)), radar data, sonar data, and the like. Additionally, the techniques described herein can be used with real data (e.g., captured using sensor(s)), simulated data (e.g., generated by a simulator), or any combination of the two.

Figure 2:
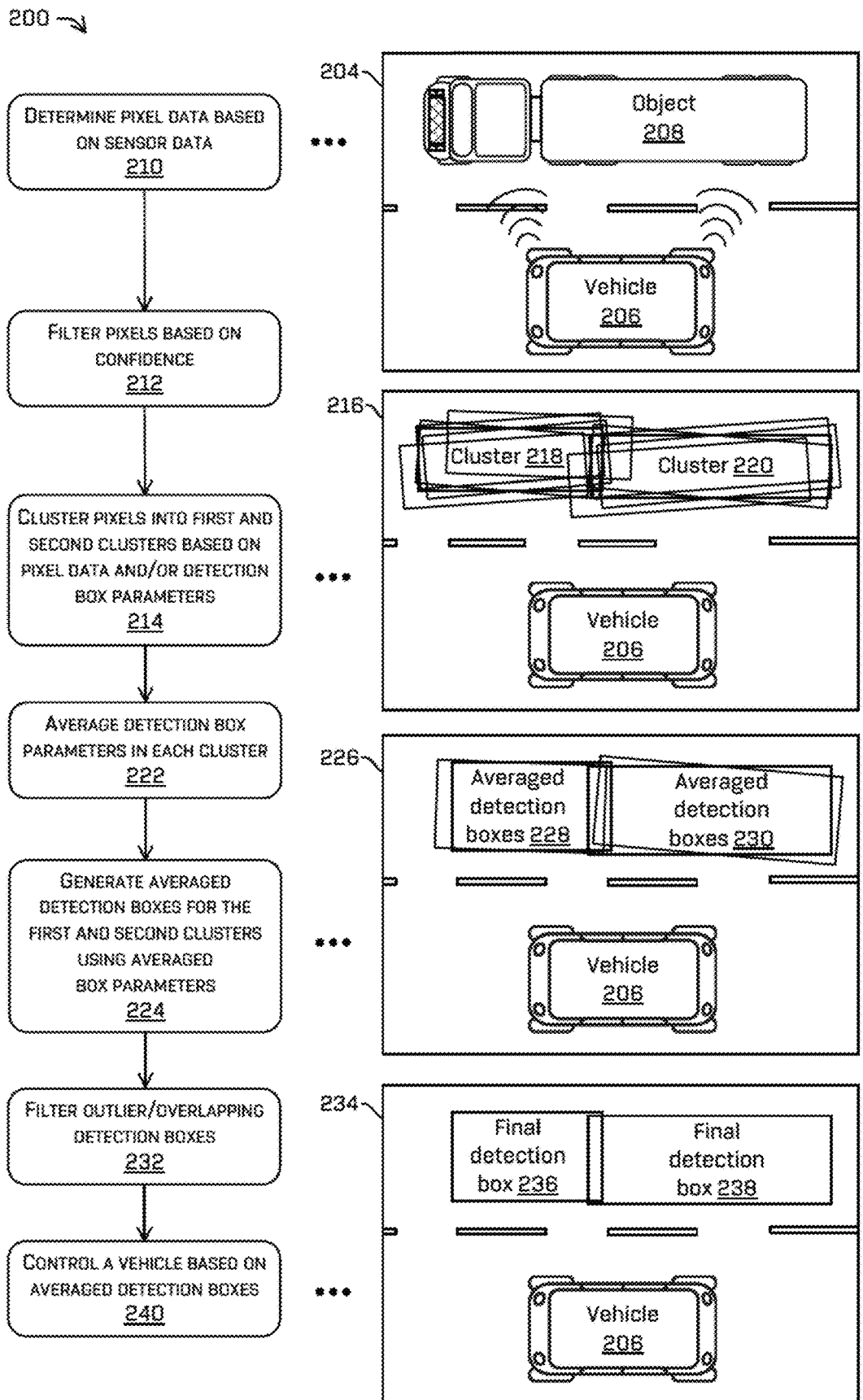
FIG. 2 a pictorial flow diagram of another example process for generating detection boxes using clustering, in accordance with examples of the disclosure.

FIG. 2 is a pictorial flow diagram of another example process 200 for pixel clustering and detection box generation. In examples, one or more operations of the process 200 may be implemented by a vehicle computing system, such as by using one or more of the components and systems illustrated in FIGS. 6 and 7 and described below. For example, one or more components and systems can include a top-down detector 662, a top-down segmenter 664, a top-down detector 692, and/or a top-down segmenter 694 illustrated in FIG. 6 and/or a top-down detector 720 and/or a top-down segmenter 721 illustrated in FIG. 7. However, the process 200 is not limited to being performed by such components and systems, and the components and systems of FIGS. 6 and 7 are not limited to performing the process 200.

In more detail, the vehicle computing system, at operation 202, receives image data that may include pixel data. The image data may include data generated based on sensor data generated and/or collected by one or more sensors configured on a vehicle traveling in an environment. In various examples, the sensors include one or more vision sensors, such as lidar sensors, camera sensors, and/or the like. The image data may represent a top-down view of the environment in which a vehicle is traveling. As with the process 100 described above, in some examples, the vehicle computing system executing the process 200 may be configured to generate the image data and/or the top-down representation utilizing the techniques such as those described in U.S. patent application Ser. No. 16/151,607, filed Oct. 4, 2018 and entitled "Trajectory Prediction on Top-Down Scenes," and in U.S. patent application Ser. No. 16/504,147, filed Jul. 5, 2019 and entitled "Prediction on Top-Down Scenes based on Action Data," the entire contents of which are incorporated herein by reference for all purposes.

An example 204 illustrates an image of an environment including a vehicle 206 that may be configured with sensors to detect objects in the environment, such as an object 208. In examples, the vehicle 206 is configured with one or more lidar systems that may each include one or more lidar components, camera systems, and/or other detection systems configured to detect objects with the environment and/or classify objects detected in the environment.

At operation 210, the vehicle computing system determines pixel data for pixels represented in the image data. In examples, the image data may include pixel data for pixels that may be associated with an object in an environment. For example, the image data associated with the example 204 may include pixel data for pixels associated with the object 208. For each such pixel, the pixel data may include data that can be used to determine detection box parameters for a detection box associated with that pixel. For example, pixel data may be used to determine detection box parameters such as extents of the detection box (e.g., dimensions, such as a length, width, height of the detection box), coordinates of a center of the detection box, a detection box center offset distance (a distance from the center of the detection box to the associated pixel), a detection box center offset direction (a direction from the pixel to the center of the detection box associated with the pixel), and position data for the detection box (e.g., yaw). Pixel data may additionally or alternatively include data such as coordinates or location information for the pixel (e.g., pixel location in a grid), an indication of a detection class assigned to the pixel (e.g., representing a class of object associated with the pixel), and/or a classification confidence value (e.g., reflecting a confidence level of classification assigned to the pixel). Note that in various implementations, any one or more pieces of such pixel data may be included in image data or generated based on image data or other pixel data.

At operation 212, the vehicle computing system selects a set of pixels potentially associated with a particular object in the environment from the pixels associated with the image data based on pixel data. In examples, the vehicle computing system may select pixels having a classification confidence value above a threshold confidence value (e.g., between 0 and 1) for a particular class assigned to the pixel (e.g., as represented in, or determined from, the associated pixel data). In various examples, the classification associated and/or classification confidence value associated with a pixel can be determined utilizing machine learning techniques, such as by a machine learned model configured to classify pixels and/or objects in an image and determine associated classification confidence values. Pixel data gathered in the past may be stored and used by a machine learned model to improve the quality of pixel data generated thereafter, thereby improving the generation of detection boxes using the technique described herein.

For example, the vehicle computing system may select those pixels classified in the class "bus" with a greater than 0.5 confidence. In examples, the vehicle computing system may additionally or alternatively use one or more other criteria to select pixels for clustering. For example, the vehicle computing system may select those pixels in the "bus" class with sufficient confidence and having detection box center coordinates sufficiently proximate to one another (e.g., less than a threshold distance apart, within a specific range of locations, share an edge in a grid, etc.). In other examples, the vehicle computing system may additionally or alternatively use the detection box center offset distances and/or directions to select pixels. In the example 204, the vehicle computing system may select those pixels that have a sufficient likelihood of being associated with object 208 based on any combination of pixel data included in or determined from the image data associated with the example 204.

At operation 214, the vehicle computing system generates one or more clusters of pixels by clustering pixels based on pixel data and/or detection box parameters determined based on pixel data. Any combination of the various types of pixel data and detection box parameters may be used to determine pixel clusters. In examples, the vehicle computing system determines a cluster by associating, in a particular cluster, those pixels that are neighbors (e.g., have proximate pixel locations (e.g., where their pixel locations share an edge in a grid, where their pixel locations are less than a threshold distance apart, etc.)), have proximate detection box centers (e.g., less than a threshold distance apart), have similar detection box center offset directions, detection box center offset distances less than a threshold distance, have similar detection box position properties (e.g., have a similar yaw value, have yaw values within a specific range of values, etc.), and/or are in the same class.

In various examples, in addition to or instead of detection box parameters, detection confidence values as described herein (e.g., representing how well a ground-truth box matches to an anchor box associated with the pixel) may be used to generate clusters. For example, the vehicle computing system may use density-based spatial clustering of applications with noise (DBSCAN) to cluster pixels with centers that are located close to one another. The vehicle computing system may then filter out pixels having lower detection confidence values (e.g., remove pixels with detection confidence values below a threshold, remove pixels not having the highest detection confidence value from among those with anchor boxes sharing a common center, etc.) The vehicle computing system may then evaluate the distance between the centers of the remaining pixels in the cluster and filter out those pixels that are not close enough to other pixels in the cluster (e.g., within a threshold distance of one another, within a threshold distance of the center of the cluster, etc.). The vehicle computing system may alternatively or in addition (e.g., when the distance between the centers of the pixels is too great) filter out those pixels having a centeredness orientation (e.g., center offset direction) that varies substantially from other pixels in the cluster (e.g., difference between centeredness orientations is greater than a threshold).

In clustering pixels, the vehicle computing system may additionally or alternatively filter one or more pixels from a cluster based on an object classification associated therewith being different from an object classification associated with other pixels in the cluster and/or from an object classification of the cluster itself. The vehicle computing system may additionally or alternatively filter one or more pixels from a cluster based on a location associated therewith being equal to or greater than a threshold distance from one or more other pixels associated with the cluster and/or from a particular point represented in a grid (e.g., center of a grid, corner of a grid, etc.). The vehicle computing system may additionally or alternatively filter one or more pixels from a cluster based on a determination that the pixels are not neighboring pixels (e.g., do not share an edge in a grid) with at least one other pixel in the cluster. In various examples, the vehicle computing system may use one or more tree data structures to represent the pixels and the relationships between them (e.g., k-d-tree, quadtree, etc.) and use one or more characteristics of such trees to determine whether and how to generate and/or filter clusters of pixels.

In examples, at operation 214 the vehicle computing system may additionally or alternatively determine an amount of overlap for detection boxes associated with the pixels and cluster those pixels associated with detection boxes that substantially or sufficiently overlap. For example, using detection box parameters associated with pairs or sets of pixels, the vehicle computing system may determine an Intersection over Union (IoU) value for the associated pairs or sets of detection boxes and then determine whether the IoU value is a sufficient value (e.g., greater than a threshold value). Where the IoU value is sufficient (e.g., indicating sufficient overlap of the detection boxes), the vehicle computing system may cluster the pixels associated with the detection boxes used to determine the IoU value.

An example 216 illustrates the detection boxes associated with two clusters of pixels, a first cluster 218 and a second cluster 220. The first cluster 218 and the second cluster 220 are associated with the pixels determined to be associated with the object 208 and clustered based on their associated pixel data and/or detection box data. The pixel data used to determine the first cluster 218 and the second cluster 220 may be data based on sensor data collected by sensors configured at vehicle 206, as noted above.

At operation 222, for the clusters generated at operation 214, the vehicle computing system may average detection box parameters for each cluster to generate, at operation 224, averaged detection boxes for that cluster. In examples, the vehicle computing system may determine average values for any one or more of the detection box parameters for detection boxes associated with individual pixels in the clusters. In various examples, the vehicle computing system may use additional or alternative techniques for determining the detection box parameters for the detection boxes for the clusters 218 and 220. For example, as described above, the vehicle computing system may perform a robust re-estimation of the detection box parameters for the detection boxes associated with the pixels in the clusters 218 and 220 to generate the detection box parameters for an averaged detection box for these clusters. The vehicle computing system may alternatively or in addition determine and use a weighting factor for any of the detection box parameter and/or other data that may be used to determine the averaged detection boxes for the clusters 218 and 220. An example 226 illustrates the averaged detection boxes 228 and 230 generated at operation 224 for the clusters 218 and 220, respectively.

At operation 232, the vehicle computing system may filter detection boxes from the averaged detection boxes that have too few associated pixels (e.g., fewer than a threshold number of pixels) and/or are associated with clusters that have low confidence (e.g., average classification confidence of the pixels in the cluster is lower than a threshold confidence value, maximum classification confidence of the pixels in the cluster is lower than a threshold confidence value, etc.).

In examples, the vehicle computing system may remove overlapping averaged detection boxes by filtering them using NMS and/or other techniques to remove overlapping detection boxes and/or outliers. Outlier averaged detection boxes may be those averaged detection boxes having one or more outlying detection box parameters. For example, an averaged detection box with a center location that is greater than a threshold distance from one or more particular centers of other averaged detection boxes associated with a cluster (e.g., averaged center of the averaged detection boxes, next closest center, etc.) may be filtered out. In another example, an averaged detection box having a yaw value that is greater than a threshold yaw value (e.g., averaged yaw value of the averaged detection boxes, next closest yaw value, etc.) may be filtered out.

An operation 240, the vehicle computing system provides the remaining final averaged detection boxes to a vehicle system for use in controlling the vehicle. An example 234 illustrates the first final detection box 236 and the second final detection box 238 associated respectively with the first cluster 218 and the second cluster 220 of the example 216. The first final detection box 236 and the second final detection box 238 represent the object 208 of the example 204 in the environment in which the vehicle 206 is operating. The first final detection box 236 and the second final detection box 238 may be used by a vehicle control system to safely operate the vehicle 206 in the environment with the object 208.

FIG. 3A illustrates an example object 310 that may be in an environment 301. Object 310 may be a large vehicle, such as a bus or truck. A large vehicle can include a vehicle that is greater than a threshold length (e.g., 15 feet, 20 feet, 10 meters, etc.) and/or width (e.g., 10 feet, 15 feet, 3 meters, etc.). Object 310 may alternatively or in addition be an articulated vehicle, such as a semi-tractor-trailer or an articulated bus. In this example, pixel data and/or detection box data (e.g., detection box parameters) for pixels associated with the object 310 may be determined based on image data associated with an image of the environment 301 that includes the object 310. Such image data may be generated and/or based on sensor data collected by one or more sensors configured on a vehicle in the environment 301.

In this example, a set of pixels associated with the object 310 may be selected based on an assigned class and a confidence value for each such pixel. For example, a set of pixels may be selected based on determining that each has been assigned to the class "bus" with a confidence value above 0.75. Pixels that do not meet these criteria may be filtered out.

Referring now to FIG. 3B, using the pixel data associated with the pixels selected based on confidence value, detection boxes 320 (solid lines) may be generated for each selected pixel. Detection boxes 325 (dashed lines) represent detection boxes associated with pixels that did not meet the confidence value selection criteria. As illustrated in FIG. 3B, some of the detection boxes 325 associated with unselected pixels capture portions of the object 310 that are not captured by the detection boxes 320 associated with selected pixels.

Referring now to FIG. 3C, one or more of the detection boxes 320 associated with the selected pixels may be filtered out as overlapping detection boxes, for example, using a filtering technique such as NMS, resulting in a final detection box 330. Detection box 330 may be used to represent the object 310 in the environment 301 by a vehicle control system operating a vehicle in the environment 301. As illustrated in FIG. 3C, because the detection boxes associated with the unselected (e.g., lower confidence) have not been included in the processing to determine the final detection box to represent the object 310, portions of the object 310 are not include within the final detection box 330. Therefore, the detection box 330 may not fully and accurately represent the object 310. This may result in a reduction of the safety of operating a vehicle in the environment 310 if that vehicle relies on such detection boxes for object identification and navigation.

Figure 4C:
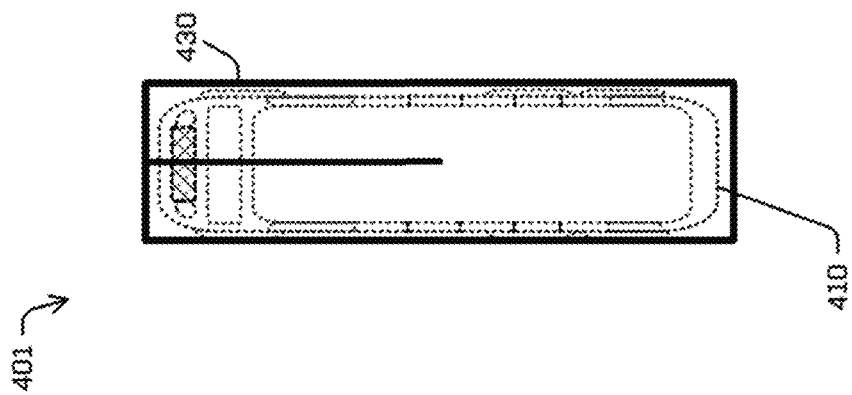
FIG. 4C is a diagrammatic representation of a detection box determined based on averaging box parameters for pixels in pixel clusters, in accordance with examples of the disclosure.
Figure 4B:
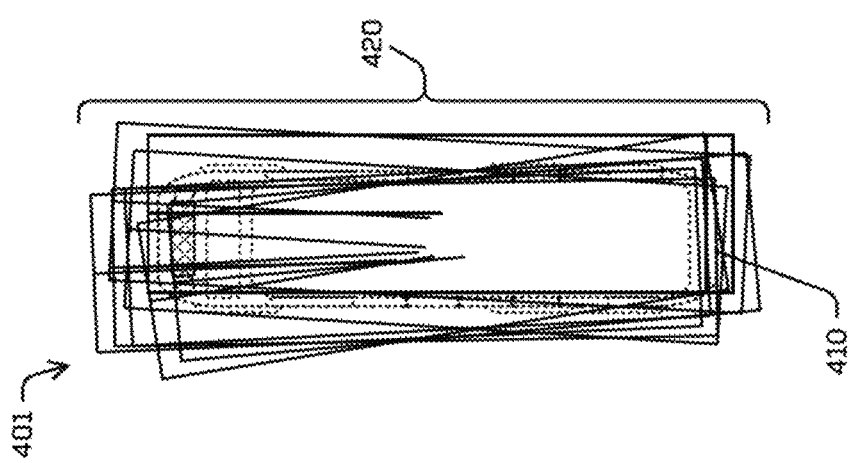
FIG. 4B is a diagrammatic representation of detection boxes associated with pixel clusters, in accordance with examples of the disclosure.
Figure 4A:
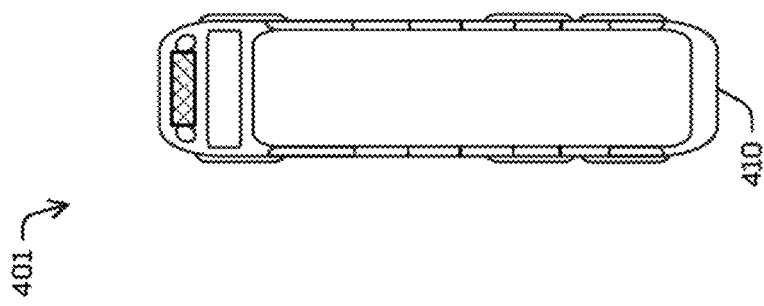
FIG. 4A is a diagrammatic representation of a large vehicle, in accordance with examples of the disclosure.

FIG. 4A illustrates an example object 410 that may be in an environment 401. Object 410 may be a large vehicle, such as a bus or truck. As defined above, a large vehicle can include a vehicle with a length and/or width greater than a threshold value. Object 410 may alternatively or in addition be an articulated vehicle such as a semi-tractor-trailer or an articulated bus. In this example, pixel data and/or detection box data (e.g., detection box parameters) for pixels associated with the object 410 may be determined based on image data associated with an image of the environment 401 that includes the object 410. Such image data may be generated and/or based on sensor data collected by one or more sensors configured on a vehicle in the environment 401.

In this example, a set of pixels associated with the object 410 may be selected based on one or more types of pixel data. In examples, pixels may be selected based on having a classification confidence value above a threshold confidence value for a particular class assigned to the pixel (e.g., as represented in, or determined from, the associated pixel data). For example, pixels classified in the class "bus" may be selected if they have a confidence value greater than 0.5, 0.6, 0.7, or the like. Pixels may additionally or alternatively be selected for clustering based on one or more other criteria. For example, pixels in the "bus" class with sufficient confidence that have detection box center coordinates sufficiently proximate to one another (e.g., less than a threshold distance apart) may be selected for a cluster. Pixels may additionally or alternatively be selected based on detection box center offset distances, detection box center offset directions, and/or detection box position properties (e.g., positions properties within a specific range of values, above or below a specified threshold, etc.). Pixels may be selected for clustering determination based on any criteria that may be used to determine that whether a pixel has sufficient likelihood of being associated with the object 410.

The selected pixels may then be clustered based on pixel data and/or detection box parameters for detection boxes associated with the selected pixels. Pixels may be associated with particular clusters based on any combination of pixel data and/or detection box parameters. Referring now to FIG. 4B, detection boxes 420 may represent a corresponding pixel cluster. This pixel cluster may be determined based on pixel data associated with the pixels therein.

For example, each of the pixels associated with the detection boxes 420 may be neighbors of one another (e.g., have pixel locations that share an edge in a location grid, have pixel locations less than a threshold distance apart, etc.) and have detection box centers that are less than a threshold distance apart from one another. In another example, each of the pixels associated with the detection boxes 420 may be neighbors (e.g., have pixel locations that share an edge in a location grid, have pixel locations less than a threshold distance apart, etc.) and have detection box centers that are less than a threshold distance apart.

In examples, an amount of overlap of the detection boxes associated with pixels may be used to determine clusters. For example, pixels associated with detection boxes that sufficiently overlap may be clustered. Sufficiency of overlap may, for example, be determined based on IoU value for sets of detection boxes and whether such IoU values are greater than a threshold value. In various examples, any one or more pieces of pixel data and/or any one or more detection box parameters, and any combination thereof, may be used to determine pixel clusters.

The parameters of the detection boxes 420 may next be averaged to generate averaged detection boxes. Pixel data for the pixels associated with the detection boxes 420 may also be used to generate averaged detection boxes for each cluster. Any clusters that have too few pixels (e.g., fewer than a threshold number of pixels) and/or clusters that have low average classification confidence (e.g., below a threshold confidence value) may be filtered out and the associated pixels may not be used to generate final averaged detection boxes used in controlling a vehicle. Next, overlapping potential final averaged detection boxes may be filtered out using NMS and/or other techniques to remove overlapping detection boxes. Outlier detection boxes may additionally or alternatively be removed using various techniques, for example as described herein.

The remaining final averaged detection box may then be used by a vehicle control system, for example to determine one or more trajectories by which to control the vehicle. Referring now to FIG. 4C, a final averaged detection box 430 may be associated with the pixel cluster associated with the detection boxes 420. As shown in FIG. 4C, the detection box 430 accurately represents the boundaries of the object 410. Therefore, the detection box 430 may allow the safer operation of a vehicle in the environment 401 because the object 410 can be accurately identified by the vehicle control system.

Figure 5C:
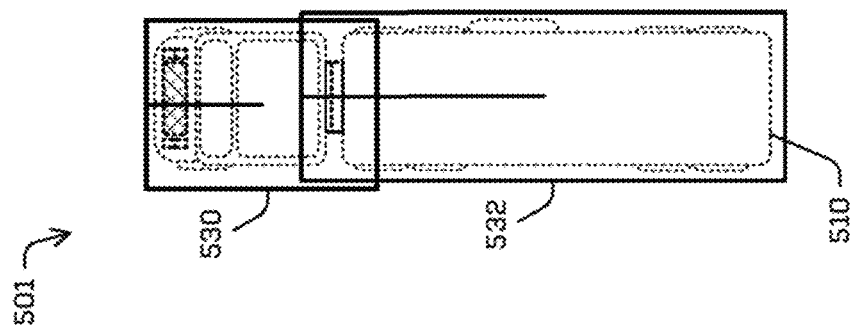
FIG. 5C is a diagrammatic representation of detection boxes determined based on averaging box parameters for pixels in pixel clusters, in accordance with examples of the disclosure.
Figure 5B:
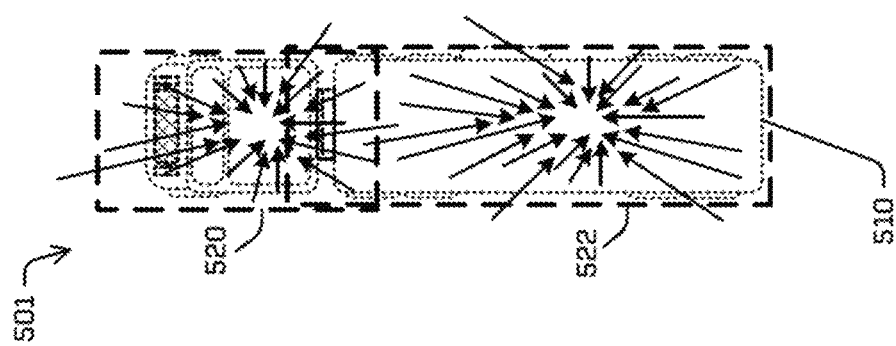
FIG. 5B is a diagrammatic representation of pixel attributes and pixel clusters, in accordance with examples of the disclosure.
Figure 5A:
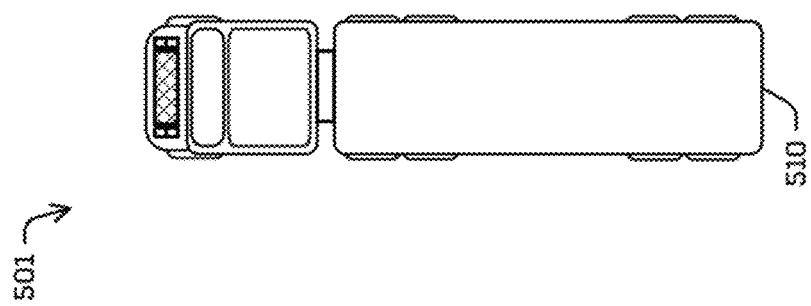
FIG. 5A is a diagrammatic representation of an articulated vehicle, in accordance with examples of the disclosure.

FIG. 5A illustrates an example object 510 that may be in an environment 501. Object 510 may be an articulated vehicle, such as a semi-tractor-trailer. In this example, pixel data and/or detection box data (e.g., detection box parameters) for pixels associated with the object 510 may be determined based on image data associated with an image of the environment 501 in which the object 510 may be present. Such image data may be generated and/or based on sensor data collected by one or more sensors configured on a vehicle in the environment 501.

A set of pixels associated with the object 510 may be selected based on one or more types of pixel data. As described herein, pixels may be selected based on a confidence value, a class, detection box center coordinates, a detection box center offset distance, a detection box center offset direction, one or more other pieces of pixel data, one or more other detection box parameters, and any combination thereof. Pixels may be selected for clustering determinations based on any criteria that may be used to determine that whether a pixel has sufficient likelihood of being associated with the object 510.

The selected pixels may then be clustered based on pixel data and/or detection box parameters for detection boxes associated with the selected pixels. Referring now to FIG. 5B, clusters of pixels 520 and 522 are illustrated with dashed lines indicating cluster boundaries. In this example, the arrows shown within clusters 520 and 522 represent a detection box center offset distance and/or a detection box center offset direction for a pixel. In examples, pixels with detection box center offset distances under a threshold and/or with similar detection box center offset directions may associated with a particular cluster. In FIG. 5B, arrows substantially within (e.g., greater than a threshold amount of the arrow is within) a particular cluster boundary represent pixels that have been selected for that particular cluster based on detection box center offset direction and/or distance criteria. Arrows that extend greater than a threshold amount beyond the boundaries of a particular cluster represent pixels whose direction and/or distance does not meet the criteria for selection for the particular cluster.

Note that some pixels may overlap cluster boundaries while meeting the criteria for selection for one of the clusters, while other pixels may meet only a subset of the criteria for selection for a cluster and therefore may not be selected any cluster. For example, the arrows shown in FIG. 5B that extend outside of all cluster boundaries may represent pixels that, while satisfying a detection box center offset direction criteria, may include a detection box center offset distance that is greater than a threshold distance, and therefore may not be selected for a cluster.

Other criteria may be used in conjunction with, or instead of, detection box center offset direction and/or distance to determine the pixels in clusters 520 and 522. For example, the pixels of clusters 520 and 522 may be neighbors (e.g., have pixel locations that share an edge in a location grid, have proximate pixel locations, have pixel locations less than a threshold distance apart, etc.), have the same assigned object class, and have similar detection box position properties (e.g., yaw). In addition, or instead, the detection boxes associated with pixels in the clusters 520 and 522 may have a determined IoU value greater than a threshold value indicating a sufficiency of overlap.

The parameters of the detection boxes associated with the pixels in each of the clusters 520 and 522 may be averaged to generate averaged detection boxes. Pixel data for the pixels in each of the clusters 520 and 522 may also be used to determine averaged detection boxes for each cluster. Any clusters that have too few pixels (e.g., fewer than a threshold number of pixels) and/or clusters that have low average classification confidence (e.g., below a threshold confidence value) may be filtered out and the associated pixels may not be used to generate final averaged detection boxes used in controlling a vehicle. Overlapping averaged detection boxes may be filtered out and/or one or more averaged detection boxes determined to be outlier detection boxes may also be removed, for example, as described herein.

The remaining final averaged detection boxes may then be used by a vehicle control system, for example to determine one or more trajectories by which to control the vehicle. Referring now to FIG. 5C, final averaged detection boxes 530 and 532 corresponding to the clusters 520 and 522, respectively, may be generated by averaging the detection box parameters within each respective cluster. Because some pixels may overlap cluster boundaries while meeting the criteria for selection for clusters, the resulting averaged detection boxes may also overlap. For example, as seen FIG. 5C, final averaged detection boxes 530 and 532 may overlap. This may ensure complete and accurate coverage of the object 510 by these detection boxes. As shown in FIG. 5C, the combined boxes 530 and 532 fully and accurately capture the boundaries of the articulated object 510. Therefore, the detection boxes 530 and 532 may allow the safer operation of a vehicle in the environment 501 because the entirety of the object 510 can be accurately identified by the vehicle control system.

FIG. 6 depicts a block diagram of an example system 600 for implementing the techniques described herein. In at least one example, the system 600 can include a vehicle 602. The vehicle 602 can include a vehicle computing device 604 that may function as and/or perform the functions of a vehicle controller for the vehicle 602. The vehicle 602 can also include one or more sensor systems 606, one or more emitters 608, one or more communication connections 610, at least one direct connection 612, and one or more drive systems 614.

The vehicle computing device 604 can include one or more processors 616 and memory 618 communicatively coupled with the one or more processors 616. In the illustrated example, the vehicle 602 is an autonomous vehicle; however, the vehicle 602 could be any other type of vehicle. In the illustrated example, the memory 618 of the vehicle computing device 804 stores a localization component 620, a perception component 622, a planning component 626, one or more system controllers 628, one or more maps 630, a prediction component 624, a deep tracking network component 632, and a data association component 634. Though depicted in FIG. 6 as residing in memory 618 for illustrative purposes, it is contemplated that each of the localization component 620, the perception component 622, the planning component 624, the one or more system controllers 626, the one or more maps 628, the prediction component 630, the deep tracking network component 632, and the data association component 634 can additionally, or alternatively, be accessible to the vehicle 602 (e.g., stored remotely).

In at least one example, the localization component 620 can include functionality to receive data from the sensor system(s) 606 to determine a position and/or orientation of the vehicle 602 (e.g., one or more of an x-, y-, z-position, roll, pitch, or yaw). For example, the localization component 620 can include and/or request/receive a map of an environment and can continuously determine a location and/or orientation of the autonomous vehicle within the map. In some instances, the localization component 620 can utilize SLAM (simultaneous localization and mapping), CLAMS (calibration, localization and mapping, simultaneously), relative SLAM, bundle adjustment, non-linear least squares optimization, or the like to receive image data, LIDAR data, radar data, IMU data, GPS data, wheel encoder data, and the like to accurately determine a location of the autonomous vehicle. In some instances, the localization component 620 can provide data to various components of the vehicle 602 to determine an initial position of an autonomous vehicle for generating a trajectory and/or for generating map data, as discussed herein.

In some instances, the perception component 622 can include functionality to perform object detection, segmentation, and/or classification. In some examples, the perception component 622 can provide processed sensor data that indicates a presence of an entity that is proximate to the vehicle 602 and/or a classification of the entity as an entity type (e.g., car, pedestrian, cyclist, animal, building, tree, road surface, curb, sidewalk, traffic signal, traffic light, car light, brake light, unknown, etc.). In additional or alternative examples, the perception component 622 can provide processed sensor data that indicates one or more characteristics associated with a detected entity (e.g., a tracked object) and/or the environment in which the entity is positioned. The perception component 622 may use detection box data and/or pixel data as described herein to generate such processed sensor data. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Such entity characteristics may be represented by a detection box as described herein (e.g., an averaged detection box generated based on pixel clustering). Characteristics associated with the environment can include, but are not limited to, a presence of another entity in the environment, a state of another entity in the environment, a time of day, a day of a week, a season, a weather condition, an indication of darkness/light, etc.

In general, the planning component 624 can determine a path for the vehicle 602 to follow to traverse through an environment. In examples, the planning component 624 can determine various routes and trajectories and various levels of detail. For example, the planning component 624 can determine a route (e.g., planned route) to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 624 can generate an instruction for guiding the autonomous vehicle along at least a portion of the route from the first location to the second location. In at least one example, the planning component 624 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 602 to navigate.

In at least one example, the vehicle computing device 604 can include one or more system controllers 626, which can be configured to control steering, propulsion, braking, safety, emitters, communication, and other systems of the vehicle 602. These system controller(s) 626 can communicate with and/or control corresponding systems of the drive system(s) 614 and/or other components of the vehicle 602.

The memory 618 can further include one or more maps 628 that can be used by the vehicle 602 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), non-visible light information (near-infrared light information, infrared light information, and the like), intensity information (e.g., lidar information, radar information, near-infrared light intensity information, infrared light intensity information, and the like); spatial information (e.g., image data projected onto a mesh, individual "surfels" (e.g., polygons associated with individual color and/or intensity)); and reflectivity information (e.g., specularity information, retroreflectivity information, BRDF information, BSSRDF information, and the like). In an example, a map can include a three-dimensional mesh of the environment. In some instances, the map can be stored in a tiled format, such that individual tiles of the map represent a discrete portion of an environment, and can be loaded into working memory as needed, as discussed herein. In at least one example, the one or more maps 628 can include at least one map (e.g., images and/or a mesh). In some examples, the vehicle 602 can be controlled based at least in part on the maps 628. That is, the maps 628 can be used in connection with the localization component 620, the perception component 622, and/or the planning component 624 to determine a location of the vehicle 602, identify objects in an environment, and/or generate routes and/or trajectories to navigate within an environment.

In some examples, the one or more maps 628 can be stored on a remote computing device(s) (such as the computing device(s) 642) accessible via network(s) 640. In some examples, multiple maps 628 can be stored based on, for example, a characteristic (e.g., type of entity, time of day, day of week, season of the year, etc.). Storing multiple maps 628 can have similar memory requirements but increase the speed at which data in a map can be accessed.

In general, the prediction component 630 can generate predicted trajectories of objects in an environment. For example, the prediction component 630 can generate one or more predicted trajectories for vehicles, pedestrians, animals, and the like within a threshold distance from the vehicle 602. In some instances, the prediction component 630 can measure a trace of an object and generate a trajectory for the object based on observed and predicted behavior.

In some instances, aspects of some or all of the components discussed herein can include any models, algorithms, and/or machine learning algorithms. For example, in some instances, the components in the memory 618 (and the memory 646, discussed below) can be implemented as a neural network.

As described herein, an example neural network is an algorithm that passes input data through a series of connected layers to produce an output. Each layer in a neural network can also comprise another neural network or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 606 can include radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, etc.), time of flight sensors, microphones, wheel encoders, environment sensors (e.g., temperature sensors, humidity sensors, light sensors, pressure sensors, etc.), etc. In certain implementations, the sensor system(s) 606 may include a lidar system 650 that may include lidar components 651, such as a point transformer 652, an aligner 654, a ground segmenter 656, and an object segmenter 660. The object segmenter 660 may include a top-down detector 662 and/or a top-down segmenter 664. The sensor system(s) 606 can include multiple instances of each of these or other types of sensors. For instance, the lidar system 650 may include individual lidar sensors located at the corners, front, back, sides, and/or top of the vehicle 602. As another example, the camera sensors can include multiple cameras disposed at various locations about the exterior and/or interior of the vehicle 602. The sensor system(s) 606 can provide input to the vehicle computing device 604. Additionally, or alternatively, the sensor system(s) 606 can send sensor data, via the one or more networks 640, to the one or more computing device(s) at a particular frequency, after a lapse of a predetermined period of time, in near real-time, etc.

In examples, the sensor system(s) 606 may be configured to perform one or more aspects of generating detections boxes based on pixel clustering as described herein. In various implementations, the lidar system 650 may perform lidar based 3-dimensional detection of an environment and objects therein using lidar sensors. For example, the lidar system 650 may detect and generate data associated with the objects in an environment in which the vehicle 602 is traveling. The collected lidar sensor data may be provided to the lidar components 651 (e.g., the point transformer 652, the aligner 654, the ground segmenter 656) to generate image and pixel data (e.g., top-down image data that includes pixel data) that can then be used by the object segmenter 660 to generate a 2-dimensional pixel map that may include one or more features. The top-down detector 662 and top-down segmenter 664 may use this pixel map to predict one or more detections and other data for pixels in the pixel map and parameters associated with the pixels, such as one or more classifications and/or confidence values. This pixel and detection data may then be used to cluster pixels and generate segments and boxes, such as the averaged detection boxes described herein, that cane them be used by the deep tracking network component 632, the data association component 634, the perception component 622, and/or the planning component 624 to generate data and/or instructions for system controller 626 for controlling the vehicle 602.

The vehicle 602 can also include one or more emitters 608 for emitting light (visible and/or non-visible) and/or sound, as described above. The emitters 608 in an example include interior audio and visual emitters to communicate with passengers of the vehicle 602. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 608 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology. The exterior emitters in this example may also, or instead, include non-visible light emitters such as infrared emitters, near-infrared emitters, and/or lidar emitters.

The vehicle 602 can also include one or more communication connection(s) 610 that enable communication between the vehicle 602 and one or more other local or remote computing device(s). For instance, the communication connection(s) 610 can facilitate communication with other local computing device(s) on the vehicle 602 and/or the drive system(s) 614. Also, the communication connection(s) 610 can allow the vehicle to communicate with other nearby computing device(s) (e.g., other nearby vehicles, traffic signals, etc.). The communications connection(s) 610 also enable the vehicle 602 to communicate with a remote teleoperations computing device or other remote services.

The communications connection(s) 610 can include physical and/or logical interfaces for connecting the vehicle computing device 604 to another computing device or a network, such as network(s) 640. For example, the communications connection(s) 610 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 602 can include one or more drive systems 614. In some examples, the vehicle 602 can have a single drive system 614. In at least one example, if the vehicle 602 has multiple drive systems 614, individual drive systems 614 can be positioned on opposite ends of the vehicle 602 (e.g., the front and the rear, etc.). In at least one example, the drive system(s) 614 can include one or more sensor systems to detect conditions of the drive system(s) 614 and/or the surroundings of the vehicle 602. By way of example and not limitation, the sensor system(s) can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 614. In some cases, the sensor system(s) on the drive system(s) 614 can overlap or supplement corresponding systems of the vehicle 602 (e.g., sensor system(s) 606).

The drive system(s) 614 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 614 can include a drive system controller which can receive and preprocess data from the sensor system(s) and to control operation of the various vehicle systems. In some examples, the drive system controller can include one or more processors and memory communicatively coupled with the one or more processors. The memory can store one or more components to perform various functionalities of the drive system(s) 614. Furthermore, the drive system(s) 614 may also include one or more communication connection(s) that enable communication by the respective drive system with one or more other local or remote computing device(s).

In at least one example, the direct connection 612 can provide a physical interface to couple the one or more drive system(s) 614 with the body of the vehicle 602. For example, the direct connection 612 can allow the transfer of energy, fluids, air, data, etc. between the drive system(s) 614 and the vehicle. In some instances, the direct connection 612 can further releasably secure the drive system(s) 614 to the body of the vehicle 602.

In some examples, the vehicle 602 can send sensor data to one or more computing device(s) 642 via the network(s) 640. In some examples, the vehicle 602 can send raw sensor data to the computing device(s) 642. In other examples, the vehicle 602 can send processed sensor data and/or representations of sensor data to the computing device(s) 642. In some examples, the vehicle 602 can send sensor data to the computing device(s) 642 at a particular frequency, after a lapse of a predetermined period of time, in near real-time, etc. In some cases, the vehicle 602 can send sensor data (raw or processed) to the computing device(s) 642 as one or more log files. In examples, the vehicle 602 can send lidar sensor data and/or data generated based on lidar sensor data (e.g., data from the lidar system 650) to the computing device(s) 642.

The computing device(s) 642 can include processor(s) 644 and a memory 646 storing a deep tracking network component 648 and/or a data association component 670. In some instances, the deep tracking network component 648 can substantially correspond to the deep tracking network component 632 and can include substantially similar functionality. In some instances, the data association component 670 can substantially correspond to the data association component 634 and can include substantially similar functionality.

The computing device(s) 642 may further include lidar components 680 (e.g., a point transformer 682, a aligner 684, a ground segmenter 686, an object segmenter 690, a top-down detector 692, and a top-down segmenter 694) that may substantially correspond to the lidar components 651 and that may be configured to generate image and pixel data used by the top-down detector 692 and the top-down segmenter 694 to cluster pixels and generate segments and boxes that may include averaged detection boxes as described herein. The segments and boxes generated by the top-down detector 692 and the top-down segmenter 694 may be provided to the deep tracking network component 648 which may provide data based on the segments and boxes to the data association component 670. The data generated by the data association component 670 may be communicated to and used by the vehicle computing device 604 for controlling the vehicle 602, for example using the perception component 622, the planning component 624, and/or the system controller(s) 626.

The processor(s) 616 of the vehicle 602 and the processor(s) 644 of the computing device(s) 642 can be any suitable processor capable of executing instructions to process data and perform operations as described herein. By way of example and not limitation, the processor(s) 616 and 644 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 618 and 646 are examples of non-transitory computer-readable media. The memory 618 and 646 can store an operating system and one or more software applications, instructions, programs, and/or data to implement the methods described herein and the functions attributed to the various systems. In various implementations, the memory can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 6 is illustrated as a distributed system, in alternative examples, components of the vehicle 602 can be associated with the computing device(s) 642 and/or components of the computing device(s) 642 can be associated with the vehicle 602. That is, the vehicle 602 can perform one or more of the functions associated with the computing device(s) 642, and vice versa.

FIG. 7 illustrates an example environment and components of a vehicle, in accordance with examples of the disclosure. The example vehicle 702 may be a driverless vehicle, such as an autonomous vehicle configured to operate according to a Level 5 classification issued by the U.S. National Highway Traffic Safety Administration. The Level 5 classification describes a vehicle capable of performing all safety-critical functions for an entire trip, with the driver (or occupant) not being expected to control the vehicle at any time. In such examples, because the vehicle 702 can be configured to control all functions from start to completion of the trip, including all parking functions, the vehicle may not include a driver and/or controls for manual driving, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

The example vehicle 702 can be any configuration of vehicle, such as, for example, a van, a sport utility vehicle, a cross-over vehicle, a truck, a bus, an agricultural vehicle, and/or a construction vehicle. The vehicle 702 can be powered by one or more internal combustion engines, one or more electric motors, hydrogen power, any combination thereof, and/or any other suitable power source(s). Although the example vehicle 702 has four wheels, the systems and methods described herein can be incorporated into vehicles having fewer or a greater number of wheels, tires, and/or tracks. The example vehicle 702 can have four-wheel steering and can operate generally with equal performance characteristics in all directions. For instance, the vehicle 702 may be configured such that a first longitudinal end of the vehicle 702 is the front end of the vehicle 702, and an opposite, second longitudinal end of the vehicle 702 is the rear end when traveling in a first direction, and such that the first end becomes the rear end of the vehicle 702 and the second end of the vehicle 702 becomes the front end of the vehicle 702 when traveling in the opposite direction. Stated differently, the vehicle 702 may be a bi-directional vehicle capable of travelling forward in either of opposite directions. These example characteristics may facilitate greater maneuverability, for example, in small spaces or crowded environments, such as parking lots and/or urban areas.

A vehicle such as the example vehicle 702 can be used to travel through an environment 700 and collect data. Such data may include data associated with objects in the environment 700, such as object 706 that may be a large and/or articulated vehicle. As defined above, a large vehicle can include a vehicle with a length and/or width greater than a threshold value. For example, the vehicle 702 can include one or more sensor systems 704. In examples, the sensor system(s) 704 may include one or more location sensors, inertial sensors, radar sensors, time-of-flight (ToF) sensors, sonar sensors, image sensors (e.g., cameras), audio sensors, infrared sensors, location sensors, etc., or any combination thereof. The sensor system(s) 704 may additionally or alternatively include a lidar system 708 that may include lidar components and devices. For example, the lidar system 708 may include lidar components 710, such as a point transformer 712, an aligner 714, a ground segmenter 716, and an object segmenter 718. The object segmenter 718 may include a top-down detector 720 and/or a top-down segmenter 721.

Certain implementations described herein may be particularly well-suited for generating detections boxes based on pixel clustering. In examples, the lidar system 708 may perform lidar-based 3-dimensional detection of an environment and objects therein using lidar sensors. For example, the lidar system 708 may detect and generate data associated with the object 706 in the environment 700. The collected lidar sensor data may be used by the lidar components 710 (e.g., the point transformer 712, the aligner 714, the ground segmenter 716) to generate image and pixel data that can then be used by the object segmenter 718 to generate a 2-dimensional pixel map that may include one or more features. The top-down detector 720 and top-down segmenter 721 may use this pixel map to predict one or more detections and other data for pixels in the pixel map and parameters associated with the pixels, such as one or more classifications and/or confidence values. This pixel and detection data may then be used to cluster pixels and generate segments and boxes 726 that may include averaged detection boxes 728 as described herein. The segments and boxes 726 may be provided to a deep tracking network 730 that may provide data based on the segments and boxes 726 to a data association and processing system 732. The data generated by the data association and processing system 732 may be used by a vehicle control system 734 for controlling the vehicle 702, for example using a perception system 736 and/or a planning system 738.

As also illustrated in FIG. 7, the sensor system(s) 704 can include one or more processors 722 and memory 724 communicatively coupled to the processor(s) 722. The memory 724 can store and provide processor-executable instructions to the processor(s) 722 to cause the sensor system(s) 704 to perform functions to cluster pixels and generate detection boxes, as detailed herein. The processor(s) 722 and/or the memory 724 may be physically integrated into the sensor system(s) 704, e.g., as an SoC, FPGA, ASIC, or the like, or, in some implementations, the processor(s) 722 and/or the memory 724 may be available to, e.g., connected to receive signals from and/or send signals to, the sensor system(s) 704.

As illustrated in FIG. 7, the sensor system(s) 704 may provide the segments and boxes 726 for processing by the deep tracking network 730 and/or the data association and processing system 732, which may provide the resulting data to the vehicle control system(s) 734 for use in controlling the vehicle 702. By way of non-limiting example, the vehicle control system(s) 734 can include a perception system 736 and a planning system 738. In examples, the perception system 736 may receive data based on the segments and boxes 726 generated by the sensor system(s) 704 and perform one or more of object detection, segmentation, and/or classification to determine objects in the data. The planning system 738 may determine a trajectory or route for the vehicle 702, e.g., relative to objects perceived by the perception system 736 based on the data generated by the sensor system(s) 704.

As noted above, fully and accurately determining the dimensions, position, and other and parameters of objects in the environment 700 and/or features of such objects may be challenging, especially when such objects include large and/or articulated vehicles. The systems and techniques described herein can improve the accuracy of detection boxes generated to represent such objects that are using in the perception and classification of objects to control a vehicle in an environment, such as vehicle 702 in environment 700. Providing the vehicle control system(s) 734 with data that includes averaged detection boxes representing objects in the environment 700, such as object 706, can improve safety outcomes, e.g., relative to providing the vehicle control system(s) 734 with detection boxes that may not fully and accurately represent objects in an environment.

EXAMPLE CLAUSES

A: A system comprising: one or more processors; and one or more computer-readable media storing instructions executable by the one or more processors, wherein the instructions, when executed, cause the system to perform operations comprising: receiving pixel data for a plurality of pixels corresponding to an object in an environment, wherein the pixel data comprises object classification confidence values associated with individual pixels of the plurality of pixels; identifying a subset of the plurality of pixels associated with the object classification confidence values above a threshold confidence value; generating, based at least in part on a detection box parameter, a cluster of pixels comprising one or more pixels of the subset of the plurality of pixels; generating an averaged detection box based at least in part on average values for detection box parameters associated with individual pixels of the cluster of pixels; and controlling a vehicle based at least in part on the averaged detection box.

B: The system of paragraph A, wherein: the pixel data comprises classifications associated with the individual pixels of the plurality of pixels; and identifying the subset of the plurality of pixels comprises identifying the subset of the plurality of pixels associated with classifications that are a same classification.

C: The system of paragraph A or B, wherein the detection box parameter comprises at least one of: a yaw value; detection box center coordinates; a detection box center offset distance; a detection box center offset direction; or detection box dimensions.

D: The system of any of paragraphs A-C, wherein: the pixel data comprises object classifications associated with the individual pixels of the plurality of pixels; and generating the cluster of pixels based at least in part on the subset of the plurality of pixels is further based at least in part on the object classifications associated with individual pixels of the subset of the plurality of pixels.

E: The system of any of paragraphs A-D, wherein: the pixel data comprises pixel locations in a grid associated with the individual pixels of the plurality of pixels; and generating the cluster of pixels from the subset of the plurality of pixels is further based at least in part on the pixel locations associated with individual pixels of the subset of the plurality of pixels.

F: The system of paragraph E, wherein generating the cluster of pixels from the subset of the plurality of pixels is further based at least in part on determining that the pixel locations in the grid associated with the individual pixels of the subset of the plurality of pixels share an edge in the grid.

G: A method comprising: receiving pixel data for a plurality of pixels corresponding to an object in an environment, wherein the pixel data comprises confidence values associated with individual pixels of the plurality of pixels; identifying a subset of the plurality of pixels based at least in part on the confidence values; generating, based at least in part on a detection box parameter, a cluster of pixels comprising one or more pixels of the subset of the plurality of pixels; generating an averaged detection box based at least in part on average values for detection box parameters for individual pixels of the cluster of pixels; and controlling a vehicle based at least in part on the averaged detection box.

H: The method of paragraph G, wherein generating the cluster of pixels comprises: determining detection box parameters for the individual pixels of the plurality of pixels, and determining, based at least in part on the detection box parameters for the individual pixels of the plurality of pixels, that detection boxes associated with the individual pixels of the cluster of pixels overlap.

I: The method of paragraph H, wherein determining that detections boxes associated with the pixels in the cluster of pixels overlap comprises determining an intersection over union (IoU) value for the detection boxes associated with the individual pixels in the cluster of pixels.

J: The method of any of paragraphs G-I, wherein controlling the vehicle based at least in part on the averaged detection box comprises: determining that a number of pixels associated with the cluster of pixels exceeds a threshold number of pixels; and in response to determining that the number of pixels associated with the cluster of pixels exceeds the threshold number of pixels, controlling the vehicle based at least in part on the averaged detection box.

K: The method of any of paragraphs G-J, the confidence values associated with the individual pixels of the plurality of pixels comprise detection confidence values; and generating the cluster of pixels is further based at least in part on the detection confidence values.

L: The method of any of paragraphs G-K, determining, based at least in part on the detection box parameter, detection box orientations for the individual pixels of the plurality of pixels; and generating the cluster of pixels is further based at least in part on the detection box orientations.

M: The method of any of paragraphs G-L, wherein generating the cluster of pixels comprises determining, based at least in part on the detection box parameter, that the individual pixels of the cluster of pixels share an edge in a location grid.

N: The method of any of paragraphs G-M, wherein the detection box parameter comprises at least one of: a yaw value; detection box center coordinates; a detection box center offset distance; a detection box center offset direction; or detection box dimensions.

O: One or more computer-readable media storing instructions that, when executed by one or more processors, perform operations comprising: receiving pixel data for a plurality of pixels associated with an object in an environment; identifying a subset of the plurality of pixels based at least in part on the pixel data; generating, based at least in part on a detection box parameter, a cluster of pixels comprising one or more pixels of the subset of the plurality of pixels; generating an averaged detection box based at least in part on average values for detection box parameters for individual pixels of the cluster of pixels; and controlling a vehicle based at least in part on the averaged detection box.

P: The one or more computer-readable media of paragraph O, wherein: the detection box parameter comprises a detection box yaw value; and generating the cluster of pixels from the subset of the plurality of pixels comprises determining that detection box yaw values for the individual pixels of the cluster of pixels are within a range of yaw values.

Q: The one or more computer-readable media of paragraph O or P, wherein: the pixel data comprises object classifications associated with individual pixels of the plurality of pixels; and identifying the subset of the plurality of pixels is based at least in part on the object classifications associated with the individual pixels of the plurality of pixels.

R: The one or more computer-readable media of any of paragraphs O-Q, wherein: the pixel data comprises object classifications associated with individual pixels of the plurality of pixels; and generating the cluster of pixels from the subset of the plurality of pixels is further based at least in part on the object classifications associated with the individual pixels of the plurality of pixels.

S: The one or more computer-readable media of any of paragraphs O-R, wherein: the pixel data comprises pixel locations associated with individual pixels of the plurality of pixels; and generating the cluster of pixels from the subset of the pixels is further based at least in part on the pixel locations associated with the individual pixels of the plurality of pixels.

T: The one or more computer-readable media of any of paragraphs O-S, wherein: the detection box parameter comprises a detection box center location; and generating the cluster of pixels from the subset of the plurality of pixels comprises determining that detection box center locations for the individual pixels of the cluster of pixels are within a range of locations.

While the example clauses described above are described with respect to one particular implementation, it should be understood that, in the context of this document, the content of the example clauses can also be implemented via a method, device, system, computer-readable medium, and/or another implementation. Additionally, any of examples A-T can be implemented alone or in combination with any other one or more of the examples A-T.

CONCLUSION

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
   one or more processors; and
   one or more computer-readable media storing instructions executable by the one or more processors, wherein the instructions, when executed, cause the system to perform operations comprising:
   receiving pixel data for a plurality of pixels corresponding to an object in an environment, wherein the pixel data comprises detection box parameters associated with individual pixels of the plurality of pixels;
   generating, based at least in part on a detection box parameter, a cluster of pixels comprising a first pixel of the plurality of pixels and a second pixel of the plurality of pixels;
   generating a detection box based at least in part on a first detection box parameter associated with the first pixel and a second detection box parameter associated with the second pixel; and
   controlling a vehicle based at least in part on the detection box.

2. The system of claim 1, wherein generating the cluster of pixels is further based at least in part on determining that a first classification for the first pixel and a second classification for the second pixel are associated with a same classification.

3. The system of claim 2, wherein the operations further comprise determining the first classification and the second classification based at least in part on the pixel data.

4. The system of claim 1, wherein generating the cluster of pixels is further based at least in part on determining that a first detection box associated with the first pixel overlaps with a second detection box associated with the second pixel.

5. The system of claim 1, wherein generating the cluster of pixels is further based at least in part on determining that a first detection box center associated with the first pixel is proximate to a second detection box center associated with the second pixel.

6. The system of claim 1, wherein the operations further comprise:
   generating, based at least in part on the detection box parameter, a second cluster of pixels excluding the first pixel and the second pixel, the second cluster of pixels comprising a third pixel of the plurality of pixels and a fourth pixel of the plurality of pixels;
   generating a second detection box based at least in part on a third detection box parameter associated with the third pixel and a fourth detection box parameter associated with the fourth pixel; and
   controlling the vehicle further based at least in part on the second detection box.

7. The system of claim 6, wherein the detection box is a first detection box, and the first detection box and the second detection box overlap.

8. A method comprising:
   receiving pixel data for a plurality of pixels corresponding to an object in an environment, wherein the pixel data comprises detection box parameters associated with individual pixels of the plurality of pixels;
   generating, based at least in part on a detection box parameter, a cluster of pixels comprising a first pixel of the plurality of pixels and a second pixel of the plurality of pixels;
   generating a detection box based at least in part on a first detection box parameter associated with the first pixel and a second detection box parameter associated with the second pixel; and
   controlling a vehicle based at least in part on the detection box.

9. The method of claim 8, wherein the detection box parameter comprises at least one of:
   a yaw value;
   detection box center coordinates;
   a detection box center offset distance;
   a detection box center offset direction; or
   detection box dimensions.

10. The method of claim 8, wherein generating the detection box comprises filtering at least one of a first detection box associated with the first pixel or a second detection box associated with the second pixel to generate the detection box.

11. The method of claim 10, wherein filtering at least one of the first detection box or the second detection box comprises using non-maximum suppression (NMS) to filter at least one of the first detection box or the second detection box to generate the detection box.

12. The method of claim 10, wherein filtering at least one of the first detection box or the second detection box is based at least in part on determining that at least one of a first center of the first detection box is greater than a threshold distance from a center of the detection box or a second center of the second detection box is greater than the threshold distance from the center of the detection box.

13. The method of claim 8, wherein receiving the pixel data comprises receiving image data representing a top-down view of an environment and comprising the pixel data.

14. The method of claim 8, wherein generating the detection box comprises averaging the first detection box parameter and the second detection box parameter to generate a third detection box parameter associated with the detection box.

15. One or more computer-readable media storing instructions that, when executed by one or more processors, perform operations comprising:
receiving pixel data for a plurality of pixels associated with an object in an environment, wherein the pixel data comprises detection box parameters associated with individual pixels of the plurality of pixels;
generating, based at least in part on a detection box parameter, a cluster of pixels comprising a first pixel of the plurality of pixels and a second pixel of the plurality of pixels;
generating a detection box based at least in part on a first detection box parameter associated with the first pixel and a second detection box parameter associated with the second pixel; and
controlling a vehicle based at least in part on the detection box.

16. The one or more computer-readable media of claim 15, wherein generating the cluster of pixels comprises determining that an intersection over union (IoU) value based at least in part on the first pixel and the second pixel is greater than or equal to a threshold value.

17. The one or more computer-readable media of claim 15, wherein generating the cluster of pixels is further based at least in part on a first detection box orientation associated with the first pixel and a second detection box orientation associated with the second pixel.

18. The one or more computer-readable media of claim 15, wherein generating the cluster of pixels is further based at least in part on first grid data associated with the first pixel and second grid data associated with the second pixel.

19. The one or more computer-readable media of claim 15, wherein generating the detection box comprises averaging the first detection box parameter and the second detection box parameter to generate a third detection box parameter associated with the detection box.

20. The one or more computer-readable media of claim 15, wherein:
the detection box is a first detection box, and
controlling the vehicle is further based at least in part on a second detection box that overlaps the first detection box.

* * * * *